Feb. 1, 1949.   C. N. HICKMAN   2,460,289
ROCKET PROJECTILE

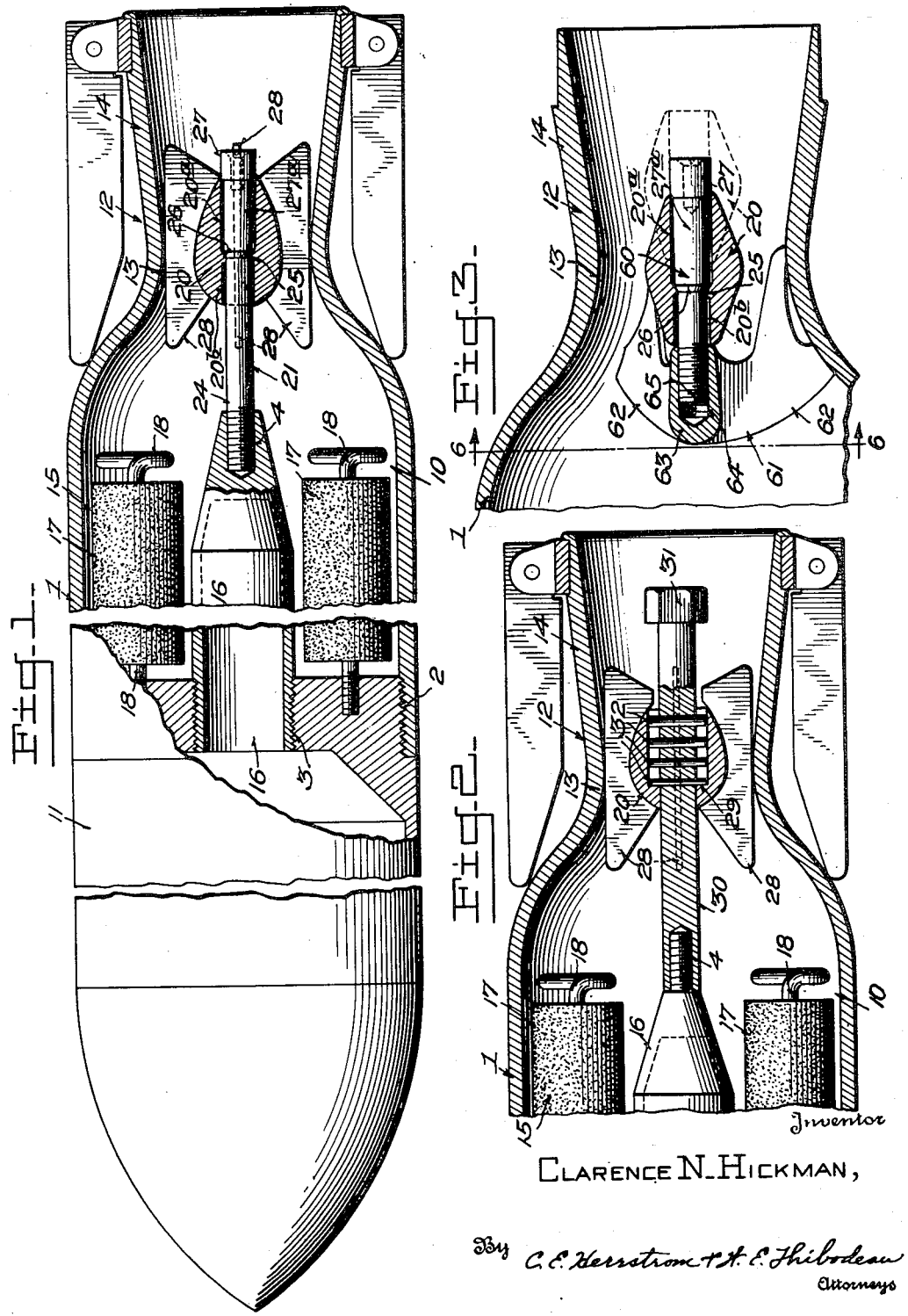

Filed March 16, 1945   2 Sheets-Sheet 2

Inventor
CLARENCE N. HICKMAN,
By C. E. Herrstrom & H. E. Thibodeau
Attorneys

Patented Feb. 1, 1949

2,460,289

UNITED STATES PATENT OFFICE 2,460,289

ROCKET PROJECTILE

Clarence N. Hickman, Jackson Heights, N. Y., assignor to the United States of America as represented by the Secretary of War Application March 16, 1945, Serial No. 583,140

9 Claims. (Cl. 102—49)

(Granted under the act of March 3, 1883, as amended April 30, 1928; 370 O. G. 757)

The invention described herein may be manufactured and used by or for the Government for governmental purposes without the payment to me of any royalty thereon.

This invention relates to an improvement in rocket propelled projectiles, more particularly to a self-adjusting pressure attachment.

Rocket propelled devices in common use today are generally propelled by a propellent charge comprising a plurality of grains of a solvent extruded, double base powder. Such rockets require rapid acceleration and hence a propellant having a high energy content, a high rate of burning, and a high heat of explosion. For this reason the double base powder has been selected for the propellant notwithstanding its inherent and marked disadvantage for use in rockets; namely, that its burning rate varies with the temperature of the powder. Most rockets utilizing this propellant are termed equilibrium rockets since such rockets are designed for operation at a certain equilibrium pressure. This equilibrium pressure for a propellant having a particular burning rate is dependent upon the ratio of the burning surface of the propellent grain to the throat area of the nozzle. If, however, the burning rate is changed by change in powder temperature, the equilibrium pressure could also change directly. Thus a slight change in the temperature of the powder will result in a considerable change in the operating pressure of the rocket projectile. As the temperature rises such pressure is greatly increased and if the temperature is lower the operating pressure is greatly reduced. The result of this is that a rocket utilizing double base powder can be built to operate only within a limited ambient temperature range. If rockets were to be fired in an ambient temperature exceeding well defined limits, dangerously excessive pressures would be developed within the chamber. Rockets fired at ambient temperature lower than the limits imposed would produce such a reduction in pressure that the rocket velocity would be lowered to such an extent as to seriously impair the effectiveness of the rocket.

Various attempts have been made in prior art rockets to control the variation in pressure developed within rocket projectiles due to temperature variations of the propellant. Various types of relief valves for venting the combustion chamber from the rocket chamber in the event of excessive pressure have been suggested. However, most of these devices relied upon manual adjustment of the port area. Such adjustment introduced a strong possibility of error due to the human factor. Other proposals which provided automatic adjustment out of the port area utilized a spring influenced member. However, it is well known that any spring influenced member is subject to vibrations and oscillations which tend to produce pressure surges within the rocket motor which are extremely detrimental to the operation of the rocket projectile.

Accordingly, it is an object of this invention to provide a pressure control device for the combustion chamber, such as utilized in rocket projectiles.

A particular object of this invention is to provide a device for rocket propelled projectiles to automatically compensate for pressure variations produced by temperature variations in the powder.

The specific nature of this invention as well as other objects and advantages thereof will clearly appear from a description of a preferred embodiment as shown in the accompanying drawings in which:

Fig. 1 is an elevational view, partly in section, of a rocket projectile including a temperature compensating device in accordance with this invention;

Fig. 2 is a longitudinal sectional view of the nozzle end of a rocket projectile including a modified form of temperature compensating device;

Fig. 3 is a partial longitudinal sectional view showing a modification of the temperature compensating device illustrated in Fig. 1 wherein a spider is utilized to support such temperature compensating device;

Figure 4:
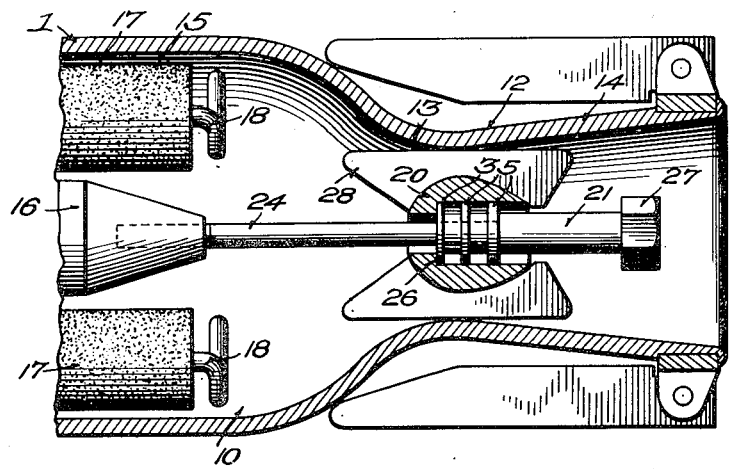
Fig. 4 is a sectional view of the nozzle portion of a rocket projectile similar to that shown in Fig. 1 but with a temperature compensating element utilizing shear rings.

To maintain the maximum pressure within the combustion chamber of a rocket projectile at a substantially constant uniform value at all powder temperatures within the operating range of the rocket, an insert is provided within the nozzle of the rocket projectile normally positioned to provide optimum operation at the lower limit of the temperature range. Upon firing the rocket at any ambient temperature in excess of a fixed limit or more particularly upon development of pressure within the combustion chamber in excess of that desired, the insert is caused to move in the direction of the gas flow to increase the discharge port area for the gases. This insert is not movable against spring action but rather against a member which requires work to be performed upon it to permit the insert to be moved. After the insert has been moved no restoring force is applied to it. Movement of the insert will continue until the port area is increased to provide for an increase in the rate of discharge sufficient to establish an equilibrium pressure for which the rocket motor was designed.

Referring to the drawings wherein like figures refer to similar parts there is show a rocket projectile 1 embodying this invention. The rocket projectile 1 comprises essentially a cylindrical combustion chamber 10, the rear end of which terminates in an integral swaged nozzle 12. On the forward end of combustion chamber 10 an ogival head 11 is secured thereto as by threads 2. The head 11 contains a "pay load" such as a high explosive material. Nozzle 12 is provided with a throat 13 which terminates in a rearwardly flared portion 14 for expanding the combustion products of a propellent charge 15. The propellent charge 15 comprises a plurality of cylindrical powder grains 17 strung on trap wires 18 of the type described and claimed in my copending application Serial No. 538,315, filed June 1, 1944. Trap wires 18 are longitudinally disposed within combustion chamber 10 parallel to the axis of such chamber and are threadably secured to the base of head 11. A burster tube 16 may be screwed into a threaded axial hole 3 in the base of head 11. Tube 16 communicates with the hollow interior of head 11 and is filled with the high explosive material similar to that contained in head 11.

A gas flow regulating member 20 having preferably a generally conical or tear drop shape, as shown in Fig. 1, is axially mounted on a rod 21 within the throat 13 of nozzle 12 thus acting as a flow constricting member. Rod 21 is suitably mounted within the combustion chamber 10 as by being secured to the end of burster tube 16 by threads 4. Rod 21 has a forward portion 24 of reduced diameter and cylindrical head 27 is provided on the extreme end of rod 21 for a purpose to be described. Such rod is slightly tapered forwardly from head 27, as shown at 27a in Fig. 1, to the frustro-conical shoulder 26, which latter tapers more abruptly to the reduced diameter portion 24. Such tapered portions are provided to improve the drawing die effect as will be presently explained. The tear drop member 20 is provided with cylindrical counterbores 20a and 20b and with an internal shoulder 25. Shoulder 25 has a conical portion complementary to the shoulder 26 and a short cylindrical portion complementary to the reduced diameter portion 24 of rod 21. Counterbore 20a is of a diameter to engage snugly the head 27 for guiding the member 20 rearwardly on the rod 21. A plurality of evenly spaced, radially disposed fins 28 are provided about tear drop member 20 and are secured thereto as by welding. Fins 28 on member 20 serve to keep such member centralized within the throat 13 of nozzle 12.

In operation of rocket projectile 1 at powder temperatures higher than the lower temperature limit of the operating range of the rocket, or for any other cause producing an undue increase in the rate of burning, a pressure will be built up within the combustion chamber 10 exceeding the designed operating pressure. Such excess pressure is relieved by forced rearward movement of the tear drop member 20 thereby increasing the free port area. This is accomplished by utilizing a much harder material for the construction of member 20 than that of the rod 21 and having such a ratio between the reduced diameter 24 and rod diameter 27a that the member 20 will act as a swaging die and forcibly move rearwardly, reducing the diameter of rod portion 27a, under action of the increased pressure within combustion chamber 10. Thus when the pressure in combustion chamber 10 exceeds the designed operating pressure the force acting upon the tear drop member 20 will be sufficient to cause this member to act in effect as a drawing die reducing rod portion 27a down to a diameter equal to the reduced diameter portion 24. Thus a non-oscillatory, energy absorbing opposition to movement of the constricting member is provided. The tear drop member 20 will continue to move rearwardly until the chamber pressure is relieved by the accompanying increase in the port area of the throat 13 or the opposition to its movement is substantially increased by virtue of the taper on rod 21. Head 27 on the end of rod 21 prevents tear drop member 20 from being forced off the end of rod 21.

Alternatively, as shown in Fig. 4, the larger diameter portion of rod 21 is composed of a series of spaced circular rings 35. Rings 35 are then successively sheared by rearward movement of constricting member 20.

A modification of the device shown in Fig. 1 within the scope of this invention is shown in Fig. 2. A rod 30 provided with an enlarged head 31 is threadably secured to a burster tube 16. Rod 30 is provided with a plurality of transverse shear members 32. Shear members 32 preferably comprise suitable pins radially mounted in transverse holes in rod 30 as shown in Fig. 2. The foremost shear pin 32 on the rod 30 is engaged by an interior shoulder 29 of tear drop member 20. A predetermined pressure exceeding that for which the rocket chamber is designed, will force member 20 rearwardly, shearing successive shear members 32. This rearward movement of tear drop member 20 increases the port area which in turn permits a faster rate of discharge of the propulsion gases. If the pressure within the chamber 10 does not fall off to a substantially low value, successive shear members 32 will be sheared off to permit further rearward movement of tear drop member 20 to provide a still further increase in port area. By providing a plurality of shear pins having a successively higher shear strength, a wide range in internal chamber pressures can be accommodated.

Figure 6:
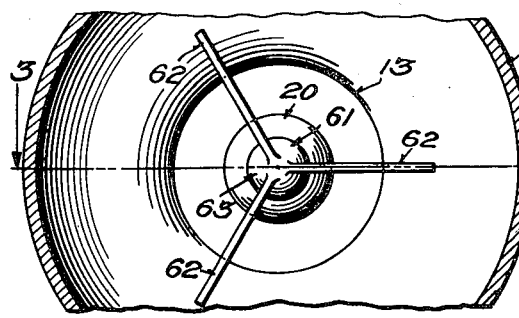
Fig. 6 is a sectional view taken along the line 6—6 of Fig. 3.

A further modification of this invention is shown in Fig. 3. A rod 60 similar to rod 21 shown in Fig. 1 is provided to accommodate the tear drop member 20. Instead of securing rod 60 to the end of burster tube 16 such rod is made appreciably shorter and is secured by threads 65 to a spider 61. Spider 61 may be a cast member comprising three equally disposed vane-like supporting legs 62 extending radially outwardly from a hub 63 as best seen in Fig. 6. Legs 62 of spider 61 are shaped to snugly engage throat 13 of body 1 and are secured thereto in any suitable manner. A threaded axial hole 64 in hub 63 receives the threaded end 65 of rod 60. This modification functions in a manner identical to that shown in Fig. 1. Head 27 of spider 61 prevents tear drop member 20 from being forced off the end of rod 60. It will be noted that centralizing fins on the constricting member 20 are not needed in this construction.

Figure 5:
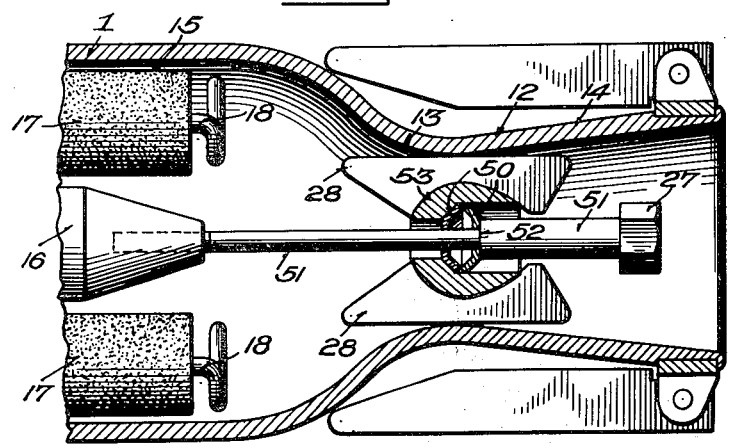
Fig. 5 is a sectional view of the nozzle portion of a rocket projectile with a temperature compensating element utilizing frustro-conical washers.

A still further modification is disclosed in Fig. 5 wherein cup washers 50 of frustro-conical form may be utilized as the resisting force to limit the movement of a hollow constricting member 53 mounted on central rod 51 provided that they are made of readily deformable material when subjected to forces in excess of the elastic limit. In this manner these cups offer no restoring force attempting to return the nozzle insert to its original position. The cup washers 50 may be strung on a central rod 51 alternating in direction and secured thereon by shoulder 52. When the force on the movable member becomes excessive these cup washers flatten out and permit the movable nozzle constriction to slide backwardly on the rod. These cup washers may be shaped to give the desired force displacement curve.

From the foregoing description it is readily apparent to those skilled in the art that a positive device for increasing the port area of the nozzle of a rocket projectile to permit automatic adjustment to relieve excessive pressures within the combustion chamber of a rocket projectile is hereby attained. Further, such device is not subject to pulsations as would occur with spring actuating devices and hence pressure surges within combustion chamber 10 are avoided.

I claim:

1. In combination, a rocket motor chamber adapted to contain a propellent material combustible to generate a propellent fluid under pressure, said chamber having a constricted exit orifice communicating with an outwardly flaring passage, a generally conical member supported within said constriction to form an annular jet of increasing cross-sectional area away from said chamber, and non-oscillatory, energy absorbing means opposing movement of said member by said fluid pressure in a direction to increase the discharge area of said annular jet, whereby said member will be displaced within said constriction only when the force of the propellent fluid on said member exceeds the opposing force of said non-oscillatory means.

2. The combination defined in claim 1 wherein said non-oscillatory, energy absorbing means comprises a rod deformable by the movement of said conical member.

3. The combination defined in claim 1 wherein said non-oscillatory, energy absorbing means comprises a rod partially insertable in said conical member and secured against movement away from said chamber, said rod having an increased diameter section disposed adjacent to said conical member and arranged to be drawn to a reduced diameter by movement of said conical member.

4. In combination, a rocket motor chamber adapted to contain a propellent material combustible to generate a propellent fluid under pressure, said chamber having a constricted exit orifice communicating with an outwardly flaring passage, a spider-type support positioned within said chamber adjacent said constricted orifice, a rod secured to said support and projecting thru said constricted orifice, an annular constricting member mounted on the projecting end of said rod and cooperating with said outwardly flaring passage to form an annular jet of increasing cross-sectional area away from said chamber, and non-oscillatory, energy absorbing means opposing movement of said member by said fluid pressure in a direction to increase the discharge area of said annular jet, whereby said member will be displaced within said constriction only when the force of the propellent fluid on said member exceeds the opposing force of said non-oscillatory means.

5. The combination defined in claim 4 wherein said last mentioned means comprises an increased diameter section on said rod disposed adjacent to said constricting member and arranged to be drawn to a reduced diameter by movement of said constricting member.

6. In combination, a rocket motor supporting a "pay load" at its forward end, said motor including a cylindrical combustion chamber adapted to contain a propellent material combustible to generate a propellent fluid under pressure, said chamber having a constricted exit orifice at the end opposite said "pay load," an outwardly flared passage leading from said exit orifice, a rod supported centrally of said flared passage to extend within said orifice, a constricting member supported on said rod within said orifice to form an annular jet for the discharge of said propellent fluid, the outer surface of said constricting member being symmetrical about the axis of said orifice and energy absorbing means restraining the rearward movement of said constricting member on said rod at chamber pressures below a predetermined value and permitting movement rearwardly with no restoring force at chamber pressures exceeding said predetermined value thereby providing an increase in the annular discharge area of said jet to reduce the fluid pressure within said chamber to said predetermined value.

7. The combination defined in claim 6 wherein said last mentioned means comprises an increased diameter section on said rod disposed rearwardly of said constricting member and arranged to be drawn to a reduced diameter by rearward movement of said constricting member.

8. The combination defined in claim 6 wherein said last named means comprises a shear ring on said rod arranged to be sheared by the rearward movement of said constricting member.

9. The combination defined in claim 6 wherein said last named means comprises a frustro-conical shaped washer surrounding said rod and arranged to be flattened by rearward movement of said constricting member.

CLARENCE N. HICKMAN.

REFERENCES CITED

The following references are of record in the file of this patent:

UNITED STATES PATENTS

| Number | Name | Date |
|---|---|---|
| 1,901,852 | Stolfa et al. | Mar. 14, 1933 |
| 2,120,246 | Fischer | June 14, 1938 |
| 2,206,057 | Skinner | July 2, 1940 |